Oct. 13, 1936.  L. H. HOOP  2,057,237
WATER FILTER AND PURIFIER
Filed Feb. 11, 1935
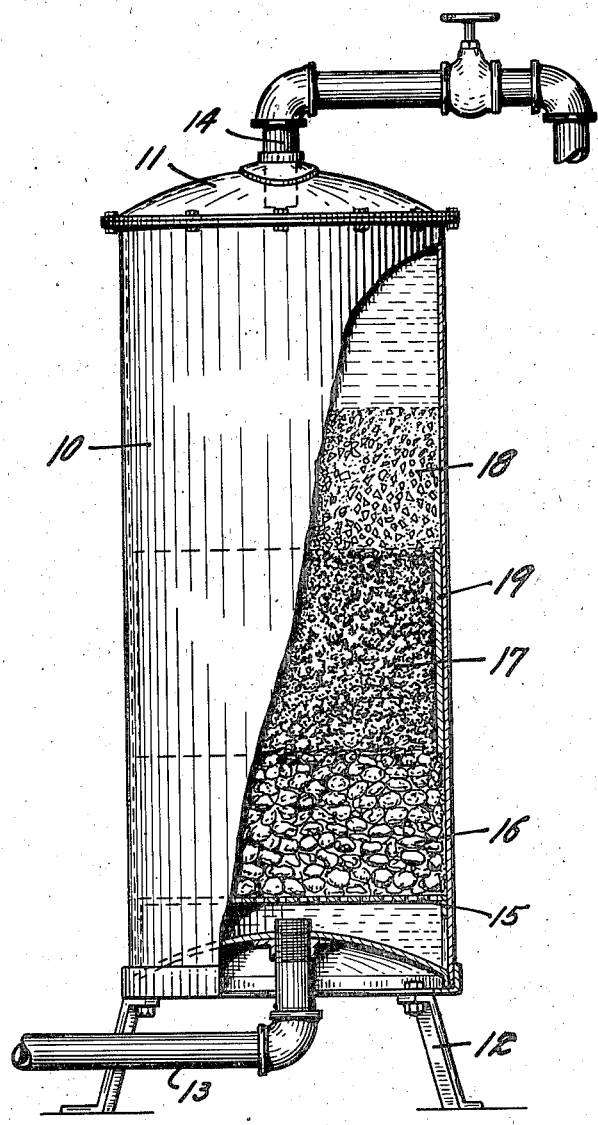
INVENTOR.
LANCE H. HOOP
BY
ATTORNEY.

Patented Oct. 13, 1936

2,057,237

UNITED STATES PATENT OFFICE 2,057,237

WATER FILTER AND PURIFIER

Lance H. Hoop, Denver, Colo.

Application February 11, 1935, Serial No. 5,907

3 Claims. (Cl. 210—134)

This invention relates to a water filter and purifier, and more particularly to an apparatus and a method for using activated carbon for the filtration and purifying of water. The principal object of the invention is to provide an apparatus and a method whereby activated carbon can be efficiently employed for purification, without requiring a prior or primary filtration.

Activated carbon has been used as a purifying medium, but heretofore, it has always been necessary to employ two tanks, one for filtering the water before it is admitted to the second tank containing the carbon for purification. If the filtering tank were omitted, the granules of activated carbon would quickly become coated with slime and extraneous material so as to so clog the pores as to render the carbon useless. In this invention, but a single tank is employed, and the raw water is both filtered and purified by the activated carbon method in this single tank.

Another object of this invention is to construct a purifier and filter in which all bed separating plates are eliminated; in which an agitation of the carbon granules is obtained which brings them into intimate contact with the water, gives a uniform distribution of the purifying action; and in which a pounding or frictional action is obtained between the carbon granules so that they will be self-cleaning during the backwashing.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

The drawing illustrates a side elevation of a typical filter tank in which the invention is embodied. In this view, the tank wall has been partially broken away to show the interior beds.

In the drawing a filtering and purifying tank is indicated at 10, closed at its top by means of a removable dome 11, and supported upon suitable legs 12. A lower pipe 13 enters the tank 10 through the bottom thereof and an upper pipe 14 enters the tank 10 through the dome 11.

Normally the pipe 14 receives raw water and the pipe 13 delivers treated water. However, during the backwashing operation, the raw water would enter through the pipe 13, and the wash water would exit through the pipe 14 to the sewer.

In the bottom of the tank 10, above the pipe 13, a dispersion medium is placed which is preferably a perforated plate 15. A bed of sand or gravel 16 is placed upon the plate 15 to support a bed of granulated activated carbon 17. The carbon 17 supports a top filter bed 18.

The filter bed 18 must be composed of a material which will have excellent filtering characteristics. In addition to this, however, the filter bed must have a lower specific gravity than the carbon in order to float upon the carbon bed and maintain its proper stratification in relation therewith; it must have a higher specific gravity than water in order to retain its position; and it must be insoluble and non-disintegrating under the action of the water.

Perforated plates have been employed for holding a filter bed in place on the carbon but these are unsatisfactory since they prevent sufficient agitation of the carbon to bring it into intimate contact with the water during the purification phase, and they prevent agitation and friction between the carbon granules so that an efficient cleansing cannot be obtained during backwashing. If a material with a relatively high specific gravity is employed for the bed 18 without a separating plate or screen, the filter material will quickly settle down into the carbon bed, and displace the latter.

It has been difficult to find an efficient insoluble filtering material having greater specific gravity than water, and less specific gravity than carbon that could be effectively employed for the bed 18. However, during the course of long experimentation, it has been found that granulated anthracite coal forms an ideal material for the filter bed 18. It has a specific gravity of 1.7, whereas the specific gravity of the carbon is 2. It is, therefore, not heavy enough to settle into the carbon bed, and "floats" thereon, and it is not light enough to float or come into suspension in the water so as to flow out with the treated water, and, if the beds 17 and 18 are disturbed during backwashing, they will always return to and maintain their relative stratification. Anthracite coal also forms an effective filter medium, is insoluble and does not disintegrate under the action of the water.

In use, the raw water enters the pipe 14 and receives its primary filtration through the bed

18. It then enters the carbon bed free from all suspended foreign material and in a uniformly dispersed flow. The high porosity of the activated carbon granules acts as a highly efficient filter and purifier to absorb all remaining impurities, odors, etc. The water then exits through the sand bed 16, which has some action as an additional filtering medium to remove any remaining traces of extraneous material, but is principally for the purpose of supporting the bed 17 in place. It then discharges from the pipe 13 as purified water.

When the filter bed 18 has become clogged and the granules of carbon have collected sufficient impurities on their surfaces to clog the pores and interfere with the purifying action, the filter must be "back washed". The backwashing operation consists of admitting raw water through the lower pipe 13. The flow of this water lifts and agitates the relatively light coal bed 18 and the activated carbon bed 17 so that all of the granules rub and pound against each other to loosen and remove the attached impurities and to provide open passageways for the exit of the impurities to the pipe 14. As soon as the backwashing flow is shut off, the beds will immediately stratify according to their specific gravities, and be ready for the next purification phase.

It is during the backwashing operation that the value of this invention is most apparent. At this time the return flow completely lifts the beds 17 and 18 so that they expand and occupy the entire tank space above the gravel bed 16. This lifting and expanding action subjects the granules to violent scrubbing and intermixing action which would be impossible if the beds were held in place with screens or the like. Yet, when the backwashing is completed, the beds will immediately resume their former stratified positions.

Activated carbon has a corrosive action upon metal tanks, and it is therefore found necessary to insert a protective sleeve 19 of noncorrosive metal in the tank around the zone normally occupied by the activated carbon.

The coal is granulated to a finer mesh than the activated carbon. In fact, it is preferred to have the coarsest of the coal granules equal to or finer than the finest of the activated carbon granules. In use, the coal and the carbon granules naturally grade themselves so that the finer particles will arrange themselves at the top of their respective beds. This produces a decreasing graduation in fineness from the bottom of the gravel bed to the top of the coal bed.

While a specific form of the improvement has been illustrated and described herein, it is desired to be understood that the same may be varied, within the scope of the appended claims, without departing from the spirit of the invention.

Having thus described the invention, what is claimed and desired secured by Letters Patent is:—

1. A water purifier comprising: a tank; a bed of gravel in the bottom of said tank; a bed of activated carbon granules supported on said bed of gravel; and a bed of finer granules of anthracite coal resting on said bed of carbon, there being an unrestricted open space in said tank above said coal so as to allow free circulation and intermingling of said coal and carbon granules during backwashing.

2. In a water filter and purifier; the combination of a bed of activated carbon particles having a specific gravity of substantially 2, and an overlying bed of granulated coal particles having a specific gravity of substantially 1.7, said coal particles being of a finer mesh than said carbon particles.

3. Means for holding a strata of activated carbon granules in place in a purifying tank comprising; a bed of sand underlying said carbon; and a bed of hard coal granules of greater fineness and of less specific gravity overlying said strata.

LANCE H. HOOP.